United States Patent
Novack et al.

(10) Patent No.: US 9,241,003 B2
(45) Date of Patent: Jan. 19, 2016

(54) METHODS, SYSTEMS, AND COMPUTER PROGRAM PRODUCTS FOR AUTHENTICATING AN ENTITY THROUGH USE OF A GLOBAL IDENTITY OF THE ENTITY THAT SERVES AS A PROXY FOR ONE OR MORE LOCAL IDENTITIES OF THE ENTITY

(75) Inventors: Brian Novack, St. Louis, MO (US); Jerry Birkes, Santa Clarita, CA (US); Alton Drake, Atlantic Highlands, NJ (US); Gary Toretti, Flower Mound, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 164 days.

(21) Appl. No.: 12/968,895

(22) Filed: Dec. 15, 2010

(65) Prior Publication Data

US 2012/0159571 A1 Jun. 21, 2012

(51) Int. Cl.
*H04L 9/32* (2006.01)
*H04L 29/06* (2006.01)

(52) U.S. Cl.
CPC .............. *H04L 63/107* (2013.01); *H04L 63/08* (2013.01)

(58) Field of Classification Search
CPC .... H04L 63/08; H04L 63/0815; H04L 63/107
See application file for complete search history.

(56) References Cited

U.S. PATENT DOCUMENTS

| | | | | |
|---|---|---|---|---|
| 6,154,172 A * | 11/2000 | Piccionelli et al. | ........ | 342/357.4 |
| 6,298,383 B1 * | 10/2001 | Gutman | .............. | H04L 63/0281 709/229 |
| 6,981,043 B2 * | 12/2005 | Botz et al. | ...................... | 709/225 |
| 7,152,108 B1 * | 12/2006 | Khan et al. | ..................... | 709/225 |
| 7,428,750 B1 * | 9/2008 | Dunn et al. | ........................ | 726/8 |
| 7,441,263 B1 * | 10/2008 | Bakshi et al. | ...................... | 726/2 |
| 7,454,622 B2 * | 11/2008 | Laidlaw | .................. | H04L 63/08 709/225 |
| 7,647,256 B2 * | 1/2010 | Burch et al. | ..................... | 705/29 |
| 7,711,788 B2 * | 5/2010 | Lev Ran et al. | ................ | 709/213 |
| 7,957,400 B2 * | 6/2011 | Henry et al. | ..................... | 370/400 |
| 2003/0177388 A1 * | 9/2003 | Botz et al. | ...................... | 713/201 |
| 2005/0071687 A1 * | 3/2005 | Pathakis et al. | ............... | 713/202 |
| 2006/0143292 A1 * | 6/2006 | Taubenheim et al. | ......... | 709/225 |
| 2007/0101438 A1 * | 5/2007 | Govindarajan | .................. | 726/27 |
| 2008/0062945 A1 * | 3/2008 | Ahuja et al. | ..................... | 370/342 |
| 2009/0132675 A1 * | 5/2009 | Horn et al. | ..................... | 709/207 |
| 2009/0133110 A1 * | 5/2009 | Kumar | .............. | H04L 29/12122 726/8 |
| 2009/0178109 A1 * | 7/2009 | Nice et al. | .......................... | 726/1 |
| 2010/0281530 A1 * | 11/2010 | Tarkoma | ........................... | 726/9 |
| 2011/0191862 A1 * | 8/2011 | Mandava et al. | ................. | 726/28 |
| 2012/0036560 A1 * | 2/2012 | Wang et al. | ....................... | 726/4 |

\* cited by examiner

*Primary Examiner* — Kaveh Abrishamkar
*Assistant Examiner* — James J Wilcox
(74) *Attorney, Agent, or Firm* — Scott P. Zimmerman, PLLC

(57) ABSTRACT

A method of authenticating an entity includes associating a local identity of the entity with a global identity of the entity, the local identity being associated with a first one of a plurality of restricted access zones, associating the global identity of the entity with particular ones of the plurality of restricted access zones for granting access to the particular ones of the plurality of restricted access zones, receiving an authentication request from the entity to access a second one of the plurality of access zones where the authentication request includes the local identity of the entity, and authenticating the entity for access to the second one of the plurality of access zones responsive to receiving the authentication request when the second one of the plurality of restricted access zones is one of the particular ones of the plurality of restricted access zones that are associated with the global identity of the entity.

14 Claims, 5 Drawing Sheets

METHODS, SYSTEMS, AND COMPUTER PROGRAM PRODUCTS FOR AUTHENTICATING AN ENTITY THROUGH USE OF A GLOBAL IDENTITY OF THE ENTITY THAT SERVES AS A PROXY FOR ONE OR MORE LOCAL IDENTITIES OF THE ENTITY

BACKGROUND

The present disclosure relates generally to computer system and network security and, more particularly, to methods, systems, computer program products for authenticating a user of a computer system and/or network.

Cloud computing is a computing paradigm where shared resources, such as processor(s), software, and information, are provided to computers and other devices on demand typically over a network, such as the Internet. In a cloud computing environment, details of the computing infrastructure, e.g., processing power, data storage, bandwidth, and/or other resources are abstracted from the user. The user does not need to have any expertise in or control over such computing infrastructure resources. Cloud computing typically involves the provision of dynamically scalable and/or virtualized resources over the Internet. A user may access and use such resources through the use of a Web browser. A typical cloud computing provider may provide an online application that can be accessed over the Internet using a browser. The cloud computing provider, however, maintains the software for the application and some or all of the data associated with the application on servers in the cloud, i.e., servers that are maintained by the cloud computing provider rather than the users of the application.

FIG. 1 illustrates a conventional cloud service model that includes Infrastructure as a Service (IaaS), Platform as a Service (PaaS), and Software as a Service (SaaS). Infrastructure as a Service, delivers computer infrastructure-typically a platform virtualization environment - as a service. Rather than purchasing servers, software, data-center space or network equipment, clients instead buy those resources as a fully outsourced service. Suppliers typically bill such services on a utility computing basis and the amount of resources consumed. Platform as a Service delivers a computing platform as a service. It provides an environment for the deployment of applications without the need for a client to buy and manage the underlying hardware and software layers. Software as a Service delivers software services over the Internet, which reduces or eliminates the need for the client to install and run an application on its own computers, which may simplify maintenance and support.

Authentication services are often based on granting access to a single resource. For example, a retailer may authenticate a customer for purchasing a product from its website, but the authentication is typically not valid to purchase a product from another retailer or possibly even another division of the retailer. Similarly, an enterprise may also authenticate uses for access to one or more restricted resources, but the authentication may be valid only for a particular department, division, or some other sub-organization of the entire enterprise. For example, a soldier who serves in the army may end up on a navy ship with a need to access one or more resources associated with the navy. It may be difficult to authenticate the soldier because his army identity cannot be authenticated by the navy's authentication service. In some instances, an entity may function as part of a node in a network structure and may require authentication as being qualified to fulfill that function in a particular network hierarchy. For example, a military application may involve a network node being implemented on a submarine. The home base for the submarine may be the Pacific Ocean region and the submarine may be authenticated as implementing a particular node in a network topology in the Pacific Ocean. The submarine may travel, however, to the Atlantic Ocean and may attempt to authenticate itself as a node in an analogous network topology in the Atlantic Ocean, but it may be difficult to authenticate the submarine's Pacific Ocean identity and position in the network hierarchy to allow the submarine to become part of a network in the Atlantic Ocean.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

Some embodiments provide a method of authenticating an entity, comprising associating a local identity of the entity with a global identity of the entity, the local identity being associated with a first one of a plurality of restricted access zones, associating the global identity of the entity with particular ones of the plurality of restricted access zones for granting access to the particular ones of the plurality of restricted access zones, receiving an authentication request from the entity to access a second one of the plurality of access zones where the authentication request comprises the local identity of the entity, and authenticating the entity for access to the second one of the plurality of access zones responsive to receiving the authentication request when the second one of the plurality of restricted access zones is one of the particular ones of the plurality of restricted access zones that are associated with the global identity of the entity.

In other embodiments, the entity has a plurality of local identities and associating the local identity of the entity with the global identity of the entity comprises associating the plurality of local identities of the entity with the global identity of the entity.

In still other embodiments, the restricted access zones are part of a common organization.

In still other embodiments, the restricted access zones are unrelated to each other.

In still other embodiments, the restricted access zones comprise a plurality of different geographic regions.

In still other embodiments, associating the global identity with particular ones of the plurality of restricted access zones comprises receiving input from the entity that identifies the particular ones of the plurality of restricted access zones.

In still other embodiments, associating the global identity of the entity with particular ones of the plurality of restricted access zones comprises receiving requests from the particular ones of the plurality of restricted access zones to associate the global identity of the entity with the particular ones of the plurality of restricted access zones, respectively.

Some further embodiments, provide a method of authenticating a node in a hierarchical network of nodes, comprising associating a local identity of the node with a global identity of the node, associating the global identity of the node with a hierarchical position in the network of nodes, receiving an authentication request from the node to connect to the hierarchical network of nodes at a requested hierarchical position, the authentication request comprising the local identity of the node, and authenticating the node for a connection to the hierarchical network of nodes at the requested hierarchical position responsive to receiving the authentication request when the requested hierarchical position in the hierarchical network of nodes matches the hierarchical position in the network of nodes associated with the global identity.

In further embodiments, the hierarchical network of nodes comprises a plurality of restricted access zones. The method further comprises associating the global identity of the node with particular ones of the plurality of restricted access zones for granting access to the particular ones of the plurality of restricted access zones. Receiving the authentication request from the node to connect to the hierarchical network of nodes comprises receiving an authentication request from the node to access one of the plurality of restricted access zones. Authenticating the node for the connection to the hierarchical network of nodes comprises authenticating the node for the connection to the hierarchical network of nodes at the requested hierarchical position responsive to receiving the authentication request from the node to access the one of the plurality of restricted access zones when the one of the plurality of restricted access zones is one of the particular ones of the plurality of restricted access zones that are associated with the global identity of the node.

In still further embodiments, the node has a plurality of local identities and associating the local identity of the node with the global identity of the node comprises associating the plurality of local identities of the node with the global identity of the node.

In still further embodiments, the restricted access zones are part of a common organization.

In still further embodiments, the restricted access zones are unrelated to each other.

In still further embodiments, the restricted access zones comprise a plurality of different geographic regions.

In still further embodiments, associating the global identity of the node with particular ones of the plurality of restricted access zones comprises receiving requests from the particular ones of the plurality of restricted access zones to associate the global identity of the node with the particular ones of the plurality of restricted access zones, respectively.

In still further embodiments, the hierarchical network of nodes comprises a hierarchical network topology of nodes.

In still further embodiments, the hierarchical network of nodes comprises a hierarchical classification of the nodes that is based on geography.

In still further embodiments, the hierarchical network of nodes comprises a hierarchical classification of the nodes that is based on associations between the respective ones of the nodes and respective organizations.

In other embodiments, at least one of the hierarchical network of nodes detects a presence of the node prior to authenticating the node for the connection to the hierarchical network of nodes.

In still other embodiments, the node detects a presence of at least one of the hierarchical network of nodes prior to authenticating the node for the connection to the hierarchical network of nodes.

Some other embodiments provide a system for authenticating an entity, comprising a processor and a memory coupled to the processor having computer readable program code stored therein that when executed by the processor is configured to cause the processor to associate a local identity of the entity with a global identity of the entity, the local identity being associated with a first one of a plurality of restricted access zones, to associate the global identity of the entity with particular ones of the plurality of restricted access zones for granting access to the particular ones of the plurality of restricted access zones, to receive an authentication request from the entity to access a second one of the plurality of access zones, the authentication request comprising the local identity of the entity, and to authenticate the entity for access to the second one of the plurality of access zones responsive to receiving the authentication request when the second one of the plurality of restricted access zones is one of the particular ones of the plurality of restricted access zones that are associated with the global identity of the entity.

Other methods, systems, articles of manufacture, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of exemplary embodiments will be more readily understood from the following detailed description of specific embodiments thereof when read in conjunction with the accompanying drawings, in which.

DETAILED DESCRIPTION

Figure 1:
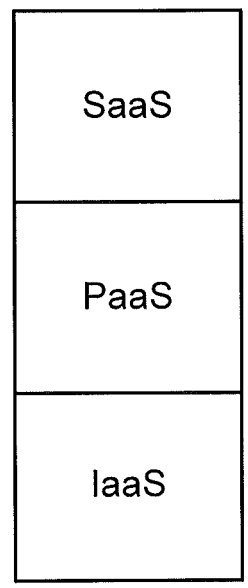
FIG. 1 is a block diagram that illustrates a conventional cloud computing paradigm.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Exemplary embodiments may be embodied as methods, systems, and/or computer program products. Accordingly, exemplary embodiments may be embodied in hardware and/or in software (including firmware, resident software, microcode, etc.). Furthermore, exemplary embodiments may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments are described herein with respect to authenticating the identity of an entity for access to one or more restricted access zones. As used herein, the entity may be anything that may have an identity associated therewith including, but not limited to, a person, a device, an organization and the like. As used herein, a restricted access zone may be anything to which access by an entity may be restricted including, but not limited to, a resource, a geographic region, information, and the like.

Some embodiments described herein are based on the concept of providing an authentication service for authenticating the identity of an entity by using a global identity of the entity as a proxy for one or more local identities of the entity. In some embodiments, the authentication service can be provided in a cloud service model so that an enterprise need not implement its own authentication protocols, but instead can customize a cloud authentication service that provides a desired level of security and efficiency. The authentication service may also be used to authenticate a node in a hierarchical network of nodes by associating both a local identity of the node and a hierarchical network position with a global identity of the node. When the node requests to connect to a particular network, the node may be authenticated for access to a particular position in the network based on the hierarchical position associated with the node's global identity.

Figure 2:
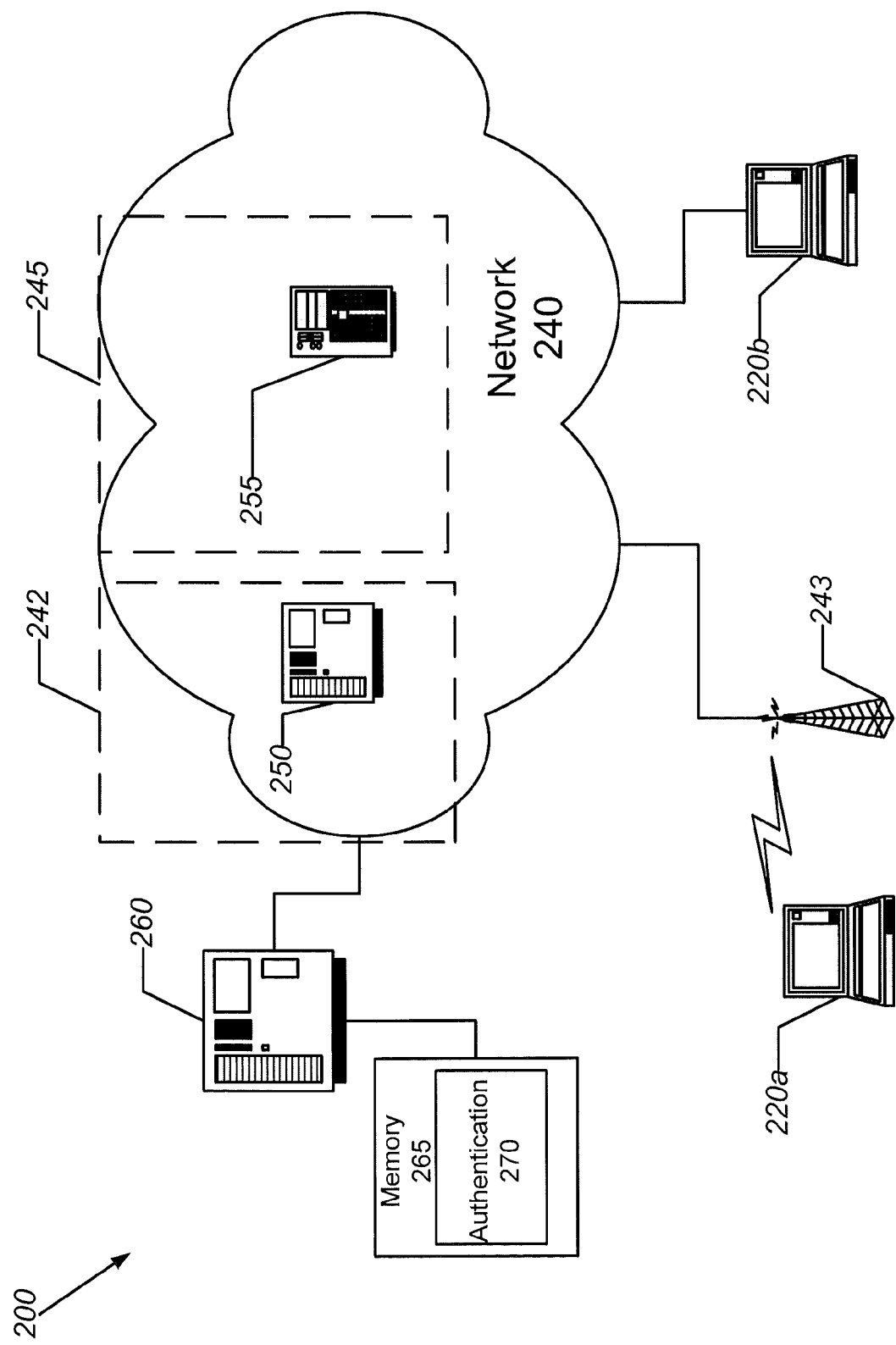
FIGS. 2 and 3 are block diagrams of communication networks that include an authentication server that is configured to authenticate an entity through use of a global identity of the entity as a proxy for one or more local identities of the entity according to some embodiments.

Referring now to FIG. 2, a communication network 200 includes an authentication server 260 that is configured to authenticate the identity of an entity by using a global identity of the entity as a proxy for one or more local identities of the entity. The communication network 200 comprises devices 220a and 220b that communicate with resources 250 and 255 over a network 240. The network 240 may represent a global network, such as the Internet, or other publicly accessible network. The network 240 may also, however, represent a wide area network, a local area network, an Intranet, or other private network, which may not accessible by the general public. Furthermore, the network 240 may represent a combination of public and private networks or a virtual private network (VPN). The network 240 includes a wireless base station transceiver 243 that may facilitate wireless communication with the mobile device 220a.

The authentication server 260 is equipped with a memory 265 that is representative of the one or more memory devices containing the software and data used to authenticate the identity of an entity by using a global identity of the entity as a proxy for one or more local identities of the entity. The memory 265 may include, but is not limited to, the following types of devices: cache, ROM, PROM, EPROM, EEPROM, flash, SRAM, and DRAM. As shown in FIG. 2, the memory 265 may contain an authentication module 270 that is configured to authenticate an entity by associating one or more local identities of an entity with a single global identity for the entity. As shown in FIG. 2, an entity, such as devices 220a and 220b, may seek to access resources 250 and 255 in access zones 242 and 245, respectively. These access zones 242 and 245 may represent, for example, different departments of a common organization or enterprise, they may represent different online retailers that are unrelated to each other, they may represent different geographic regions, etc. in accordance with various embodiments of the present invention. An entity may, for example, have a local identity that is used when accessing a resource in one of the access zones 242 and 245. This local identity, however, may not be used to access a resource in another one of the access zones 242 and 245. The party or parties that manage the access zones 242 and 245 may use the authentication server 260 to authenticate entities that request access to resources under their control. Thus, an entity may have a local identity for accessing access zone 242. When this entity attempts to access zone 245 using its local identity for access zone 242, the authentication server 260 obtains a global identity for the entity based on the local identity for access zone 242. The authorization server 260 maintains associations between the global identity of the entity and any access zones that the entity may be authenticated to access. The authentication server 260 authenticates the entity for accessing resources in access zone 245 (e.g., resource 255) when there is an association between the global identity for the entity and access zone 245.

Although FIG. 2 illustrates an exemplary communication network and an exemplary hardware/software architecture that may be used in a data processing system, such as the authentication server 260, for authenticating the identity of an entity by using a global identity of the entity as a proxy for one or more local identities of the entity, it will be understood that embodiments of the present invention are not limited to such a configuration but are intended to encompass any configuration capable of carrying out operations described herein.

Figure 3:
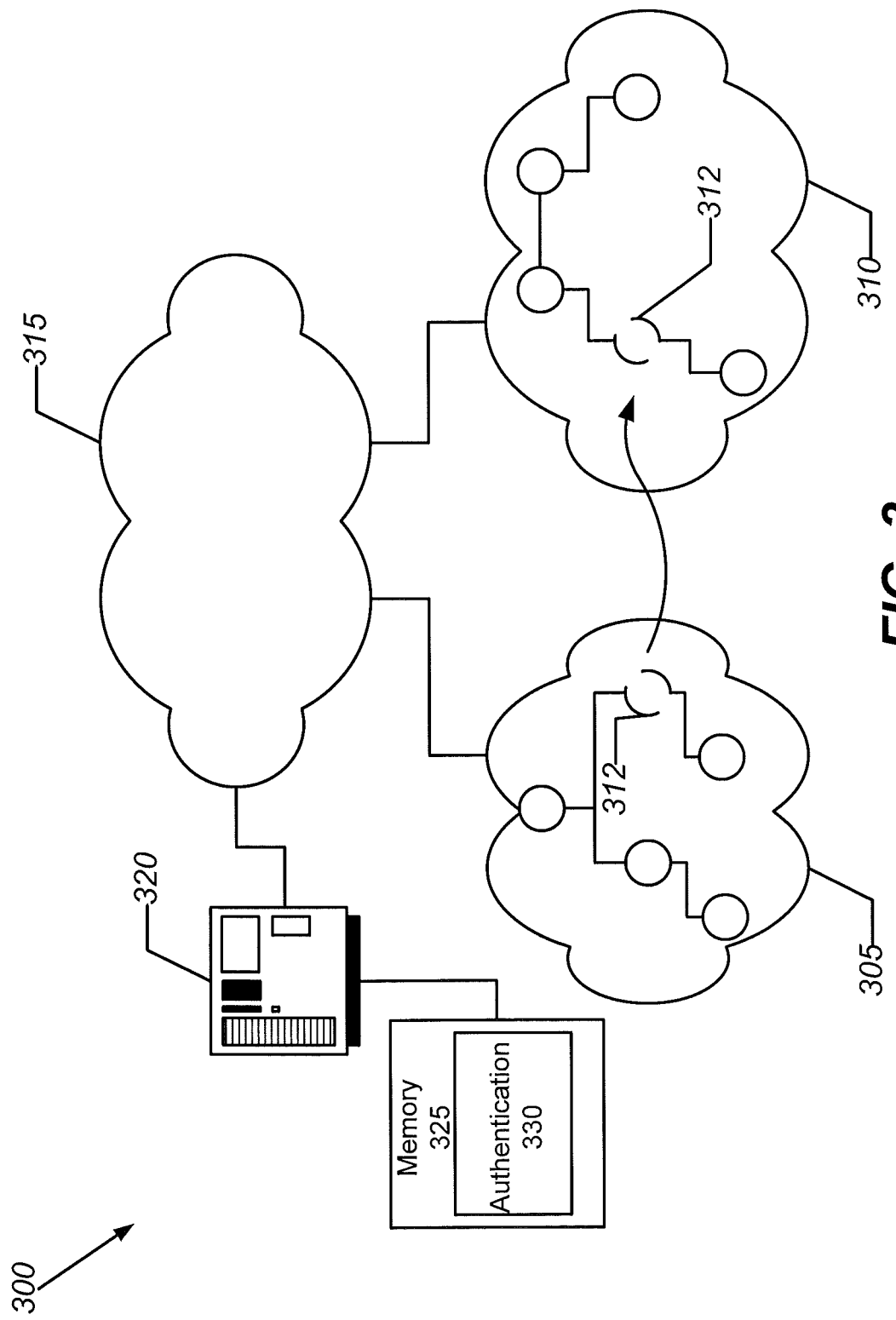

Referring now to FIG. 3, a communication network 300 includes an authentication server 320 that is configured to authenticate a node in a hierarchical network of nodes by associating both a local identity of the node and a hierarchical network position with a global identity of the node. The communication network 300 comprises networks 305, 310, and 315 that comprise one or more hierarchical networks of nodes. The networks 305, 310, and 315 may represent a global network, such as the Internet, or other publicly accessible networks. The networks 305, 310, and 315 may also, however, represent a wide area network, a local area network, an Intranet, or other private network, which may not accessible by the general public. Furthermore, the networks 305, 310, and 315 may represent a combination of public and private networks or a virtual private network (VPN).

As shown in FIG. 3, each of the networks 305 and 310 include a hierarchical network of nodes. A node 312 in the network 305 is configured to leave the network 305 and attempt to connect to the hierarchical network of nodes in the network 310. For example, in a military application, the node 312 may be a submarine, airplane, tank, or even a communication operative that is part of a mobile special operations team that served as a communication node in a network hierarchy in network 305, but traveled or simply is needed to fulfill a similar communication node function in the network hierarchy of network 312.

The authentication server 320 is equipped with a memory 325 that is representative of the one or more memory devices containing the software and data used to authenticate a node in a hierarchical network of nodes by associating both a local identity of the node and a hierarchical network position with a global identity of the node. The memory 325 may include, but is not limited to, the following types of devices: cache, ROM, PROM, EPROM, EEPROM, flash, SRAM, and DRAM. As shown in FIG. 3, the memory 325 may contain an authentication module 330 that is configured to authenticate a node in a hierarchical network of nodes based on an association between a global identity of the node and both a local identity of the node and a hierarchical position. The authentication server 320 may maintain associations between any local identities a node may have and any hierarchical network positions a node may function as and a single global identity for the node. When a node, such as node 312, requests to connect to a hierarchical network of nodes, such as the hierarchical network shown in network 310, the authentication server 320 may process the local identity of the node 312 to obtain the global identity of the node 312 and proceed with authenticating the node 312 to connect to the network hierarchy in network 310 if the requested position in the network hierarchy matches a hierarchical position associated with the global identity of the node 312.

According to further embodiments, the authentication techniques of FIG. 3 regarding authenticating a node for a connection to a network hierarchy can be combined with the authentication techniques of FIG. 2 regarding authenticating an entity for access to a restricted access zone.

Although FIG. 3 illustrates an exemplary communication network and an exemplary hardware/software architecture that may be used in a data processing system, such as the authentication server 320, for authenticating a node in a hierarchical network of nodes by associating both a local identity of the node and a hierarchical network position with a global identity of the node, it will be understood that embodiments of the present invention are not limited to such a configuration but are intended to encompass any configuration capable of carrying out operations described herein.

Computer program code for carrying out operations of data processing systems and servers described above with respect to FIGS. 2 and 3, such as authentication server 260 and 320, may be written in a high-level programming language, such as Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. Embodiments described herein, however, are not limited to any particular programming language. It will be further appreciated that the functionality of any or all of the program modules may also be implemented using discrete hardware components, one or more application specific integrated circuits (ASICs), or a programmed digital signal processor or microcontroller.

Exemplary embodiments are described herein with reference to flowchart and/or block diagram illustrations of methods, systems, and computer program products in accordance with exemplary embodiments. These flowchart and/or block diagrams further illustrate exemplary operations for authenticating the identity of an entity by using a global identity of the entity as a proxy for one or more local identities of the entity and for authenticating a node in a hierarchical network of nodes by associating both a local identity of the node and a hierarchical network position with a global identity of the node in accordance with some embodiments. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 4:
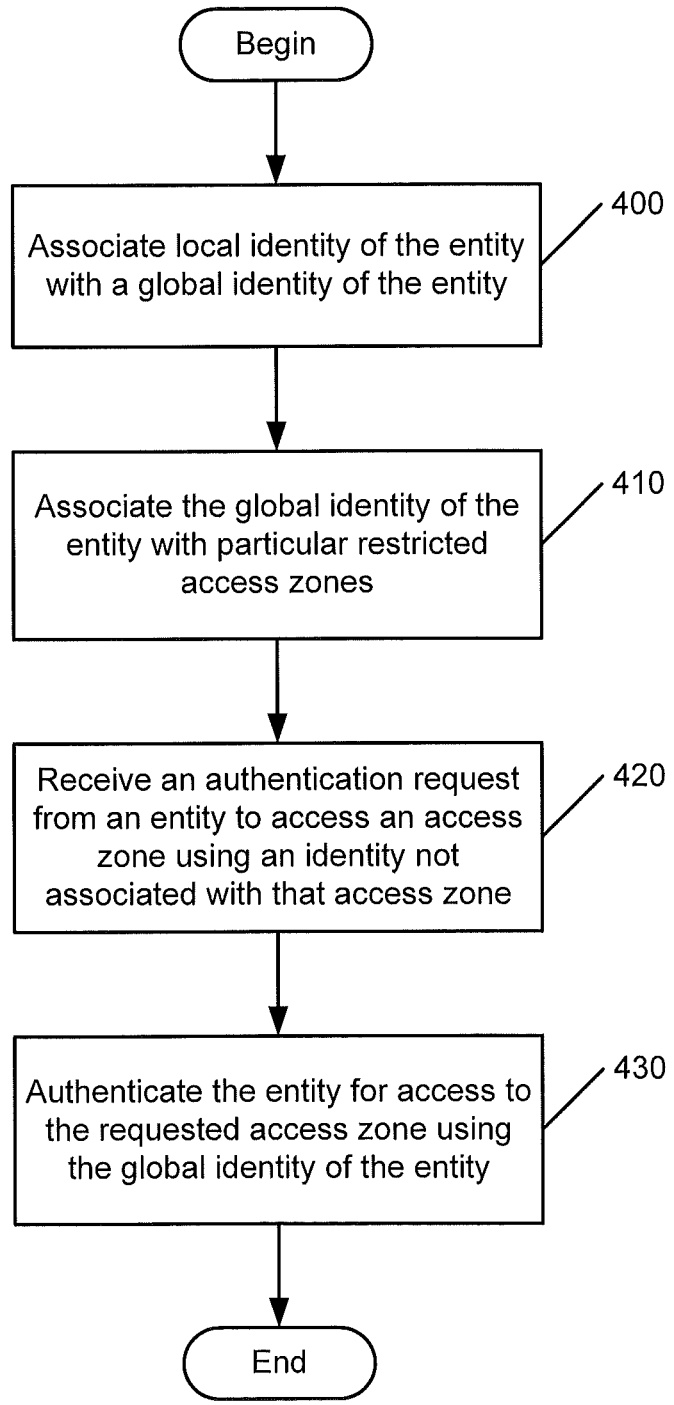
FIGS. 4 and 5 are flowcharts that illustrate operations for authenticating an entity through use of a global identity of the entity as a proxy for one or more local identities of the entity and authenticating a node in a hierarchical network of nodes by associating both a local identity of the node and a hierarchical network position with a global identity of the node according to some embodiments.

Referring now to FIG. 4, exemplary operations for authenticating the identity of an entity by using a global identity of the entity as a proxy for one or more local identities of the entity begin at block 400 where an entity registers with the authentication server 260 to associate one or more local identities of the entity with a global identity for the entity. The one or more local identities of the entity may correspond to a plurality of restricted access zones, respectively. In accordance with various embodiments, the restricted access zones may be part of a common organization, may be unrelated each other, and/or may comprise a plurality of different geographic regions. At block 410, the global identity of the entity is associated with one or more particular ones of the plurality of restricted access zones. The associations between the global identity of the entity and the particular ones of the restricted access zones may be made in response to request(s) from the entity and/or the particular ones of the restricted access zones. The entity may then request authentication to access a restricted access zone using a local identity that is not associated with the restricted access zone at block 420. The authentication server 260 may authenticate the entity for access to the requested restricted access zone at block 430 by obtaining the global identity for the entity based on the local identity that was submitted with the request and then determining that there is an association between the global identity of the entity and the requested restricted access zone.

Embodiments according to FIG. 4 for authenticating an entity using a global identity as a proxy for one or more local identities may be illustrated by way of example. In a military application, a special operations soldier may have multiple local identifiers based on particular theatres of operation where the soldier serves. The soldier registers his local identifiers with the authentication server 260, which associates these local identifiers with a single global identity. The special operations command provides the authentication server with names of the particular fields of operation where the soldier may be deployed, which may correspond to restricted access zones as described above. These fields of operation are associated with the soldier's global identity. When the soldier is deployed for assignment to a foreign country, he attempts to log in to a local military network at his deployment site using a local identifier from his home military base. The local military network in the foreign country, however, had been identified as a restricted access zone previously for the soldier and was associated with the soldier's global identity. As a result, the authentication server 260 authenticates the soldier for access to the local military network in the foreign country even though the soldier attempted to access the local military network in the foreign country using an identity associated with his home military base. Thus, embodiments of the present invention may allow a party to use a single or few local identities to access many restricted access zones by associating any local identities of the party and any restricted access zones that the party wishes to access with a single global identity.

Figure 5:
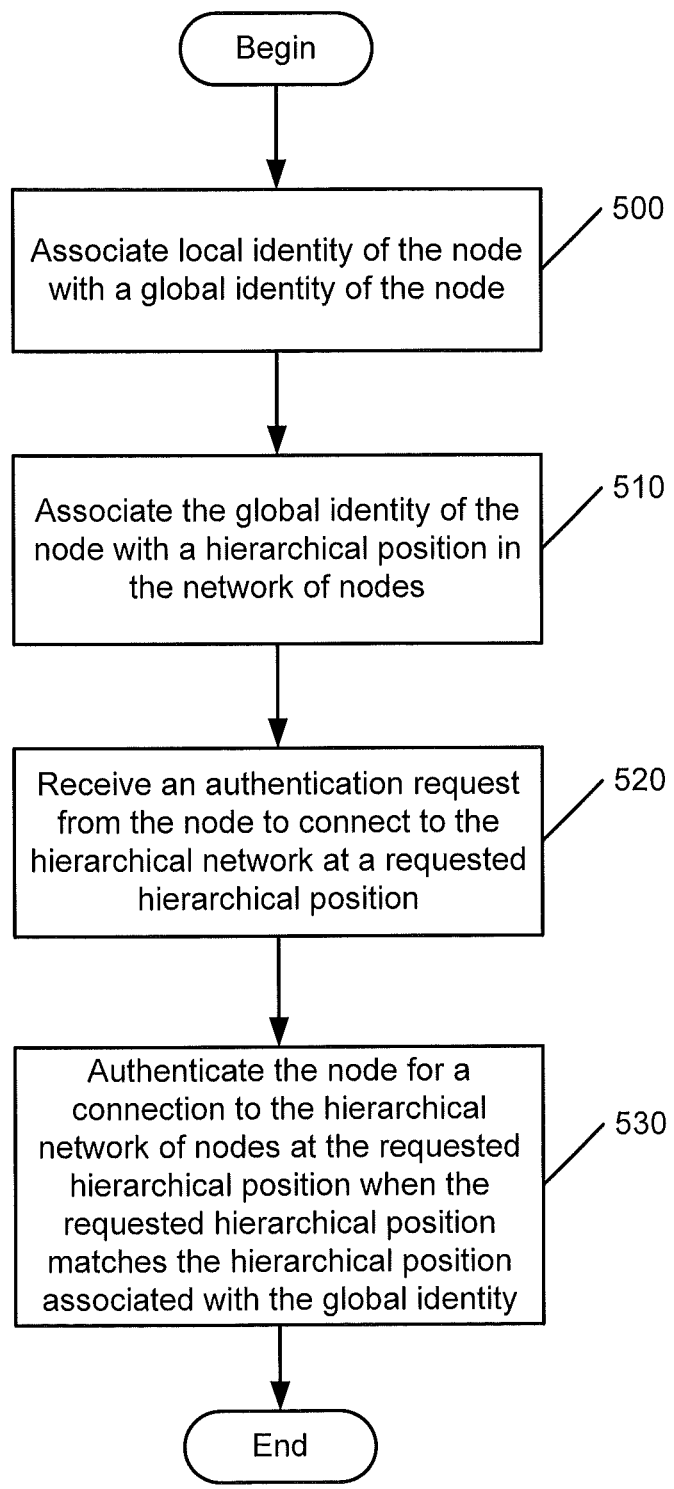

Referring now to FIG. 5, exemplary operations for authenticating a node in a hierarchical network of nodes by associating both a local identity of the node and a hierarchical network position with a global identity of the node begin at block 500 where a network node registers with the authentication server 320 to associate a local identity of the network node with a global identity of a network node. The global identity of the network node is further associated with one or more hierarchical network positions that the node may function as at block 510. The node then submits a request to the authentication server 320 at block 520 to connect to a hierarchical network of nodes at a particular position in the hierarchy. The request includes a local identity of the node. In accordance with various embodiments, the hierarchical network of nodes may comprise a hierarchical network topology of nodes. In some embodiments, the hierarchical network of nodes comprises a hierarchical classification of nodes that is based on geography. In further embodiments, the hierarchical network of nodes comprises a hierarchical classification of nodes that is based on associations between respective ones of the nodes and respective organizations. The authentication server 320 uses the local identity of the node at block 530 to obtain the global identity of the node. The authentication server 320 then compares the requested hierarchical network position with the hierarchical network position(s) that have been associated with the global identity of the node and authenticates the node for the requested connection to the hierarchical network of nodes at the particular position in the hierarchy when there is a match between the requested hierarchical network position and the hierarchical network positions associated with the global identity of the node.

In some embodiments, the hierarchical network of nodes may be viewed as a self-organizing network. For example, a node may advertise its presence to other nodes both in and outside the network hierarchy. This may be done in various ways, such as, but not limited to, broadcasting presence information, providing access to presence information that can be read by other nodes, incorporating presence information in communication protocols used for other purposes, etc. The presence information may be received and processed by another node and if the receiving node can connect to node whose presence is detected, a network connection may be formed. Such embodiments may be illustrated by way of example. A network node A, which is part of a network fabric at level two advertises its presence. A node B is not attached to any network, but is looking to connect to the hierarchical network at a level one position. Node B detects node A's presence and level two position in the network hierarchy. As node B can connect to node A as a subordinate at a level one position, node B proceeds with the authentication process as described above to connect to Node A in the hierarchical network at the level one position. In other embodiments, Node B could have broadcast its presence, which was detected by network node A. Network node A could then invite node B to authenticate itself to the hierarchical network for attachment to node A.

Embodiments according to FIG. 5 for authenticating a node in a hierarchical network of nodes by associating both a local identity of the node and a hierarchical network position with a global identity of the node may be illustrated by way of example. In a military application, a soldier may act as a communication node in a battlefield network to communicate with artillery, air support, and a command base. The soldier registers one or more of his local identifiers with the authentication server 320, which assigns a global identity to the soldier and associates the soldier's local identities with the global identity. The soldier also registers his role as a communication node in a tactical battlefield operation, such that he can communicate with artillery, air support, and a command base. The military command has provided information to the authentication server that the soldier cannot communicate with other nodes responsible for missile launches from off shore submarines. The soldier is deployed to the field and attempts to connect to the military's battlefield network using the soldier's local identity with a request to communicate with both the command base and the local artillery units. The authentication server 320 obtains the soldier's global identity that is associated with his local identity and examines the position in the network hierarchy that the soldier is requesting. In this example, the soldier is requesting a node position that is capable of communicating with both the command base and local artillery units, which is allowable based on the associations made with the soldier's global identity on the authentication server 320. Accordingly, the soldier is authenticated to act as a communication node between the command base and the local artillery units in the field. If, however, the soldier had requested authentication for attaching to the military's battlefield network with a communication capability with off shore submarines responsible for missile launches, the authentication server 320 would not have authenticated the soldier for attaching to the military's battlefield network as this hierarchical position in the network was not associated with the soldier's global identity.

The flowcharts of FIGS. 4 and 5 illustrate the architecture, functionality, and operations of some embodiments of methods, systems, and computer program products for authenticating the identity of an entity by using a global identity of the entity as a proxy for one or more local identities of the entity and for authenticating a node in a hierarchical network of nodes by associating both a local identity of the node and a hierarchical network position with a global identity of the node. In this regard, each block represents a module, segment, or portion of code, which comprises one or more executable instructions for implementing the specified logical function(s). It should also be noted that in other implementations, the function(s) noted in the blocks may occur out of the order noted in FIGS. 4 and 5. For example, two blocks shown in succession may, in fact, be executed substantially concurrently or the blocks may sometimes be executed in the reverse order, depending on the functionality involved.

According to some embodiments described above, a cloud implemented authentication service may use of a global identity as a proxy for multiple local identities may allow a party to be authenticated for access to many different restricted access resources using any of the party's local identities as the global identity may provide a virtual mapping between all of the party's local identities and all of the resources that the party may be authenticated to access. According to further embodiments described above, a cloud implemented authentication service may provide node based authentication where network nodes create a network fabric and may detach from the fabric and operate independently and establish new local fabrics that other nodes can attach/detach from while maintaining any hierarchical rules for the networks fabrics.

Many variations and modifications can be made to the preferred embodiments without substantially departing from the principles of the present invention. All such variations and modifications are intended to be included herein within the scope of the present invention, as set forth in the following claims.

That which is claimed:

1. A method of authenticating an entity, comprising:
    receiving, by a server, an electronic authentication request sent from a device requesting an authentication associated with an online retailer, the electronic authentication request specifying a local identity associated with a different online retailer;
    querying, by the server, an electronic database for the local identity, the electronic database having electronic database associations between a global identity and different local identities associated with different online retailers, each one of the different local identities being associated with one of different restricted access zones, the global identity required when accessing any restricted access zone;
    retrieving, by the server from the electronic database, the global identity having one of the electronic database associations with the local identity associated with the different online retailer;
    retrieving, by the server from the electronic database, a different local identity having another one of the electronic database associations between the global identity and the online retailer; and
    authenticating access to the restricted access zone associated with the online retailer based on the global identity and the different local identity.

2. The method of claim 1, further comprising using the global identity as a proxy.

3. The method of claim 1, wherein the different restricted access zones are part of a common organization.

4. The method of claim 1, wherein the different restricted access zones are unrelated to each other.

5. The method of claim 1, wherein the different restricted access zones comprise a plurality of different geographic regions.

6. The method of claim 1, further comprising associating the global identity with all of the different restricted access zones.

7. The method of claim 1, further comprising receiving requests from respective ones of the different restricted access zones to associate the global identity with the respective ones of the different restricted access zones, respectively.

8. A system for authenticating an entity, comprising:
    a processor; and
    a memory coupled to the processor, the memory storing code that when executed causes the processor to perform operations, the operations comprising:
    receiving an electronic authentication request sent from a device requesting an authentication associated with an online retailer, the electronic authentication request specifying a local identity associated with a different online retailer;
    querying an electronic database for the local identity associated with the different online retailer, the electronic database having electronic database associations between a global identity and different local identities associated with different online retailers, each one of the different local identities being associated with a first one of a plurality of restricted access zones associated with a corresponding one of the different online retailers, the entity being prevented from accessing a second one of the plurality of restricted access zones without the global identity of the entity being associated with the local identity of the entity, and the global identity;
    retrieving, from the electronic database, the global identity having one of the electronic database associations with the local identity associated with the different online retailer;
    retrieving, from the electronic database, a different local identity having another one of the electronic database associations between the global identity and the online retailer; and
    authenticating the entity for access to the second one of the plurality of restricted access zones based on the global identity of the entity and the different local identity associated with the online retailer.

9. The system of claim 8, wherein the operations further comprise using the global identity as a proxy.

10. The system of claim 8, wherein the plurality of restricted access zones are part of a common organization.

11. The system of claim 8, wherein the plurality of restricted access zones are unrelated to each other.

12. The system of claim 8, wherein the plurality of restricted access zones comprise a plurality of different geographic regions.

13. The system of claim 8, wherein the operations further comprise receiving input from the entity that identifies the plurality of restricted access zones to associate the global identity of the entity with all of the plurality of restricted access zones.

14. The system of claim 8, wherein the operations further comprise receiving requests from respective ones of the plurality of restricted access zones to associate the global identity of the entity with the respective ones of the plurality of restricted access zones, respectively.

* * * * *